(12) United States Patent
Silverbrook

(10) Patent No.: US 6,488,360 B2
(45) Date of Patent: Dec. 3, 2002

(54) NOZZLE ARRANGEMENT FOR AN INK JET PRINTHEAD THAT INCLUDES A COILED ACTUATOR

(75) Inventor: Kia Silverbrook, Balmain (AU)

(73) Assignee: Silverbrook Research Pty Ltd., Balmain (AU)

(*) Notice: Subject to any disclaimer, the term of this patent is extended or adjusted under 35 U.S.C. 154(b) by 0 days.

(21) Appl. No.: 09/900,177

(22) Filed: Jul. 9, 2001

(65) Prior Publication Data

US 2001/0050701 A1 Dec. 13, 2001

Related U.S. Application Data

(63) Continuation-in-part of application No. 09/112,808, filed on Jul. 10, 1998, now Pat. No. 6,302,528, and a continuation-in-part of application No. 09/112,779, filed on Jul. 10, 1998, now Pat. No. 6,220,694, and a continuation-in-part of application No. 09/113,068, filed on Jul. 10, 1998, now Pat. No. 6,254,220, and a continuation-in-part of application No. 09/112,754, filed on Jul. 10, 1998, now Pat. No. 6,238,040.

(30) Foreign Application Priority Data

Jul. 15, 1997 (AU) .............................................. P07991
Jul. 15, 1997 (AU) .............................................. P08068

(51) Int. Cl.$^7$ ................. B41J 2/14; B41J 2/04

(52) U.S. Cl. .............................................. 347/54; 347/48
(58) Field of Search ............................. 347/20, 44, 47, 347/54, 48

(56) References Cited

U.S. PATENT DOCUMENTS

| 4,370,662 A | 1/1983 | Hou et al. | |
|---|---|---|---|
| 5,612,723 A | * 3/1997 | Shimura et al. | ............... 347/46 |
| 5,980,719 A | * 11/1999 | Cherukuri et al. | ............. 347/55 |

FOREIGN PATENT DOCUMENTS

| JP | 403153359 A | * 7/1991 | ................... 347/54 |
|---|---|---|---|
| JP | 403153359 A | 7/1991 | |
| JP | 404001051 A | * 1/1992 | ................... 347/54 |

* cited by examiner

Primary Examiner—John Barlow
Assistant Examiner—An H. Do

(57) ABSTRACT

A nozzle arrangement for an ink jet printhead includes a substrate. An actuator is positioned on the substrate to facilitate the ejection of ink from a nozzle chamber of the nozzle arrangement. The actuator includes an elongate, flexible, curved actuator arm having an inner end and an outer end, the inner end being fixed to the substrate. An actuating mechanism is operatively arranged with respect to the actuator arm to straighten the actuator arm at least partially when activated such that the outer end is displaced to an extent sufficient to perform work.

11 Claims, 6 Drawing Sheets

NOZZLE ARRANGEMENT FOR AN INK JET PRINTHEAD THAT INCLUDES A COILED ACTUATOR

REFERENCES TO US APPLICATIONS

This application is a continuation-in-part application of Ser. No. 09/112,808, now U.S. Pat. No. 6,302,528. U.S. application Ser. No. 09/112,779, now U.S. Pat. No. 6,220,694, Ser. No. 09/113,068, now U.S. Pat. No. 6,254,220 and Ser. No. 09/112,754, now U.S. Pat. No. 6,238,040 all filed Jul. 10, 1998, are hereby incorporated by reference.

FIELD OF THE INVENTION

This invention relates to ink jet printheads. More particularly, this invention relates to a nozzle arrangement that includes a coiled actuator.

BACKGROUND TO THE INVENTION

The Applicant has invented an ink jet printhead that is capable of generating text and images at a resolution of up to 1600 dpi.

In order to achieve this, the Applicant has made extensive use of micro electro-mechanical systems technology. In particular, the Applicant has developed integrated circuit fabrication techniques suitable for the manufacture of such printheads.

As a result of the fabrication techniques developed by the Applicant, it has become possible for the Applicant to fabricate printheads that contain up to 84000 nozzle arrangements. In most of these embodiments, each nozzle arrangement includes one or more moving components which act on ink in a nozzle chamber to eject that ink from the nozzle chamber.

A particular field in which the Applicant has spent a substantial amount of time and effort is the development of a suitable actuator to drive the moving components. A number of constraints limit designs available to the Applicant. These constraints are as a result of the fact that the printheads are manufactured in accordance with an integrated circuit fabrication technique. Such techniques involve what is generally a deposition and etching process which is carried out under strictly controlled conditions. It follows that nozzle arrangements manufactured in accordance with such techniques must, of necessity, be in a layered form. Still further, as is well known by those of ordinary skill in the field of integrated circuit fabrication, the cost of on-chip real estate is extremely high. It follows that it is desirable for actuators to take up as little space on or in the chip, as possible.

The present invention has been conceived by the Applicant in an attempt to address the problems associated with fabricating nozzle arrangements incorporating moving components such as actuators.

SUMMARY OF THE INVENTION

According to a first aspect of the invention, there is provided a nozzle arrangement for an ink jet printhead, the nozzle arrangement comprising a substrate; and an actuator that is positioned on the substrate to facilitate the ejection of ink from a nozzle chamber of the nozzle arrangement, the actuator comprising an elongate, flexible, curved actuator arm having an inner end and an outer end, the inner end being fixed to the substrate; and an actuating mechanism that is operatively arranged with respect to the actuator arm to straighten the actuator arm at least partially when activated such that the outer end is displaced to an extent sufficient to perform work.

According to a second aspect of the invention, there is provided an ink jet printhead which comprises a substrate; and a plurality of nozzle arrangements positioned on the substrate, each nozzle arrangement comprising an actuator to facilitate the ejection of ink from a nozzle chamber of the nozzle arrangement, the actuator comprising an elongate, flexible, curved actuator arm having an inner end and an outer end, the inner end being fixed to the substrate; and an actuating mechanism that is operatively arranged with respect to the actuator arm to straighten the actuator arm at least partially when activated such that the outer end is displaced to an extent sufficient to perform work.

The invention is now described, by way of example, with reference to the accompanying drawings. The specific nature of the following description should not be regarded as limiting in any way the broad scope of this summary.

DETAILED DESCRIPTION OF THE DRAWINGS

Figure 1:
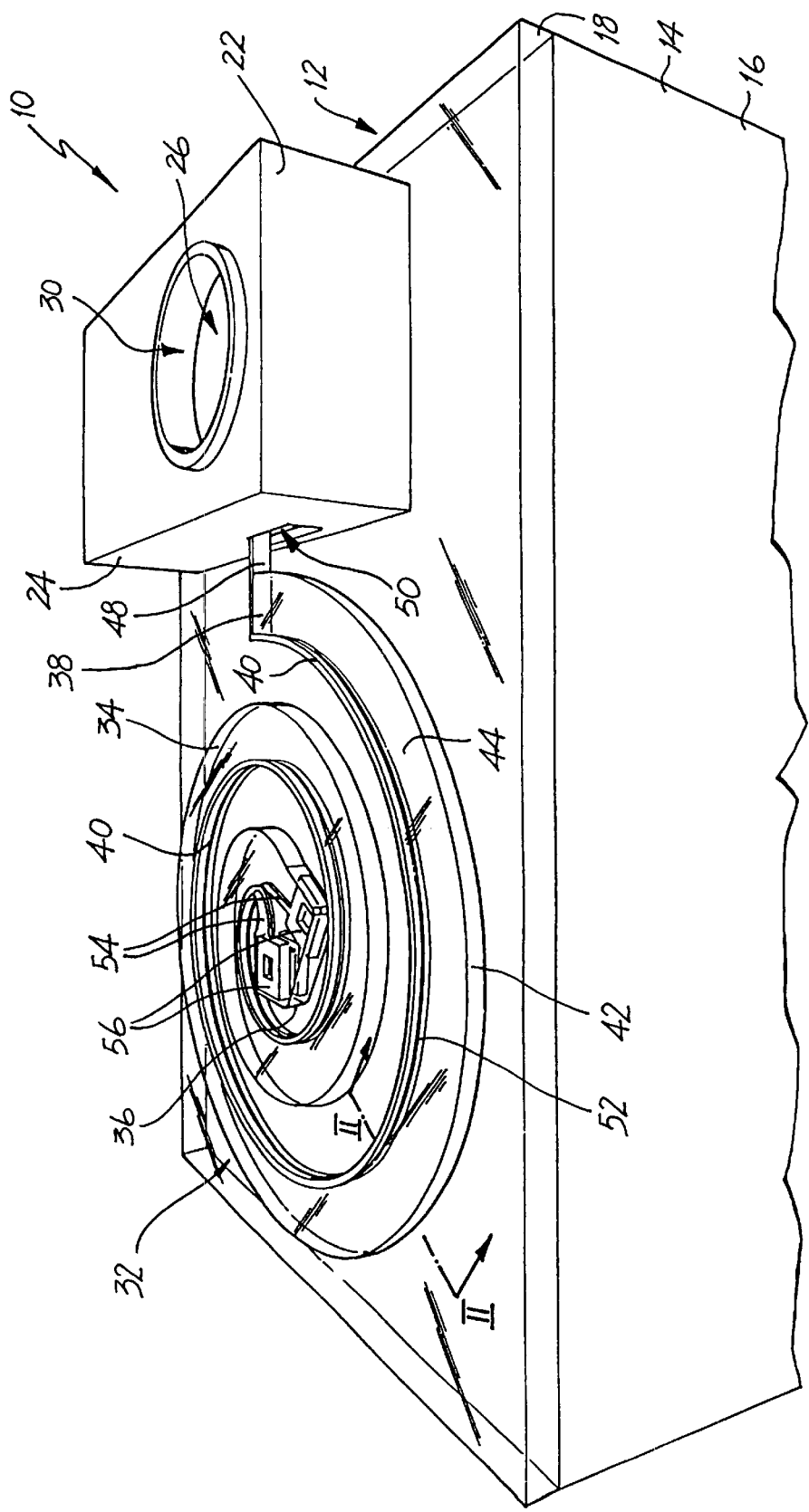
FIG. 1 shows a three dimensional view of a first embodiment of a nozzle arrangement, in accordance with the invention, for a printhead chip.

In FIGS. 1 to 5, reference numeral 10 generally indicates a first embodiment of a nozzle arrangement, in accordance with the invention, for an ink jet printhead.

The nozzle arrangement 10 is one of a plurality of such nozzle arrangements which are positioned and arranged together to define a printhead, part of which is shown at 12.

The printhead 12 has a substrate 14 which includes a wafer substrate 16 and a drive circuitry layer 18 positioned on the wafer substrate 16. An ink inlet channel 20 is defined through the wafer substrate 16 and the drive circuitry layer 18.

A pair of opposed, minor nozzle chamber walls 22 and a pair of opposed major nozzle chamber walls 24 are positioned on the drive circuitry layer 18 to define a nozzle chamber 26. A roof wall 28 is positioned on the nozzle chamber walls 22, 24 and defines an ink ejection port 30. The ink inlet channel 20, the nozzle chamber 26 and the ink ejection port 30 are all in fluid communication with each other.

The nozzle arrangement 10 includes an actuator 32 that is positioned on the substrate 14 for ejecting ink from the nozzle chamber 26 out of the ink ejection port 30.

The actuator 32 includes an elongate, flexible, coiled actuator arm 34. The actuator arm 34 has an inner end 36 and an outer end 38.

The actuator arm 34 is coiled through approximately 720°. The actuator arm 34 has a rectangular transverse cross section to define an inner minor side 40, an outer minor side 42 and a pair of opposed major sides 44, 46, the side 46 being proximate the drive circuitry layer 18. The inner end 36 of the actuator arm 34 is fixed to the substrate 14 while the remainder of the actuator arm 34 is displaceable with respect to the substrate 14.

A paddle 48 is mounted on the outer end 38 of the actuator arm 34. One of the major nozzle chamber walls 24 has a slot 50 defined therein. The paddle 48 extends through the slot 50 to be positioned within the nozzle chamber 26. The paddle 48 is substantially rectangular and is oriented normally with respect to the substrate 16.

Figure 2:
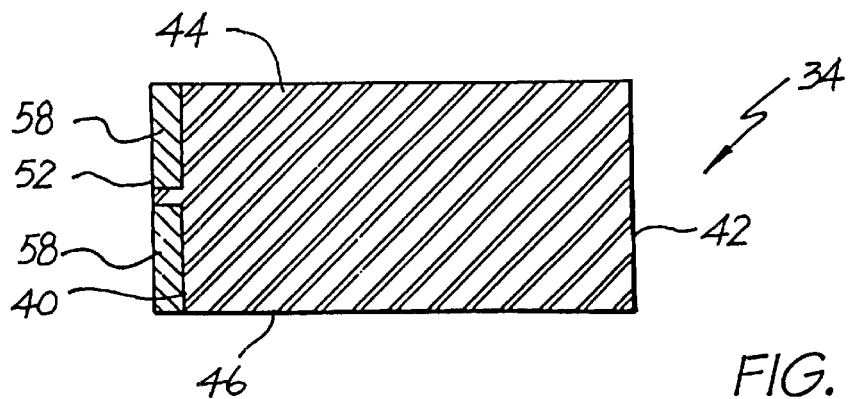
FIG. 2 shows a transverse cross sectional view of an actuator arm of the nozzle arrangement of FIG. 1.

The actuator 32 includes an actuating mechanism in the form of a heater element 52 positioned on the inner minor side 40 of the actuator arm 34 to extend a length of the actuator arm 34. The heater element 52 has ends 54 which are each connected to respective vias 56 so that the heater element 52 can be electrically connected to the drive circuitry layer 18. In particular, the heater element 52 extends the length of the inner minor side 40 and doubles back to define an electrical circuit. Thus, as can be seen in FIG. 2, the heater element 52 defines two spaced portions 58 attached to the inner side 40.

The heater element 52 is of a material which is capable of being resistively heated when an electrical current from the drive circuitry layer 18 is set up in the heater element 52 through the vias 56. Further, the heater element 52 is of a material which is capable of expansion when so heated. The material of the actuator arm 34 and the heater element 52 is such that when the heater element 52 expands, the expansion results in a partial uncoiling of the actuator arm 34. Thus, the outer end 38 and, consequently, the paddle 48 are displaced relative to the substrate 14.

Figure 3:
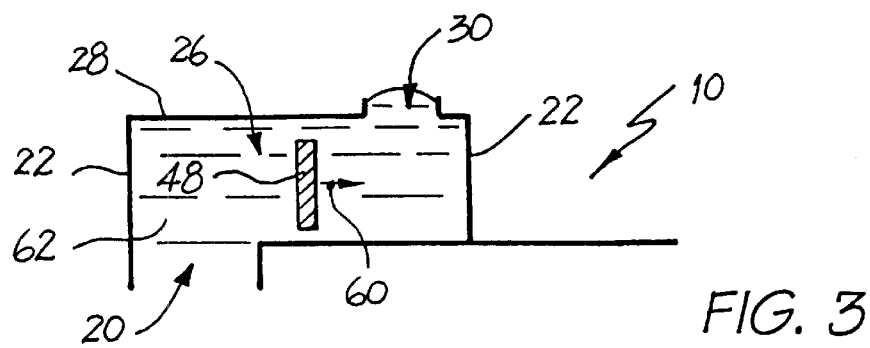
FIG. 3 shows a schematic end view of the nozzle arrangement of FIG. 1 in an initial operative condition.

In particular, the actuator arm 34 and the paddle 48 are positioned so that, prior to the current being set up in the heater element 52, the paddle 48 is in the position shown in FIG. 3. As can be seen, in this position, the paddle 48 is spaced from the ink ejection port 30.

Figure 4:
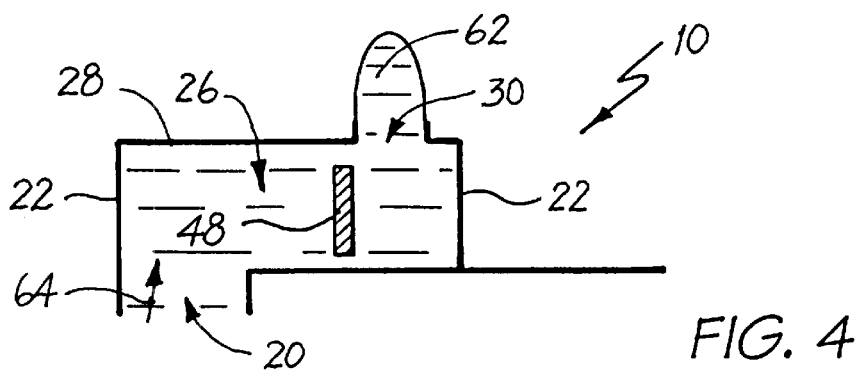
FIG. 4 shows a schematic view of the nozzle arrangement of FIG. 1 in an intermediate operative condition.

Upon expansion of the heater element 52, the paddle 48 is driven in the direction of an arrow 60 towards the ink ejection port 30 as shown in FIG. 4, to eject ink 62 from the ink ejection port 30. This movement also permits more ink 62 to enter the nozzle chamber 26 as indicated by an arrow 64 in FIG. 4.

Figure 5:
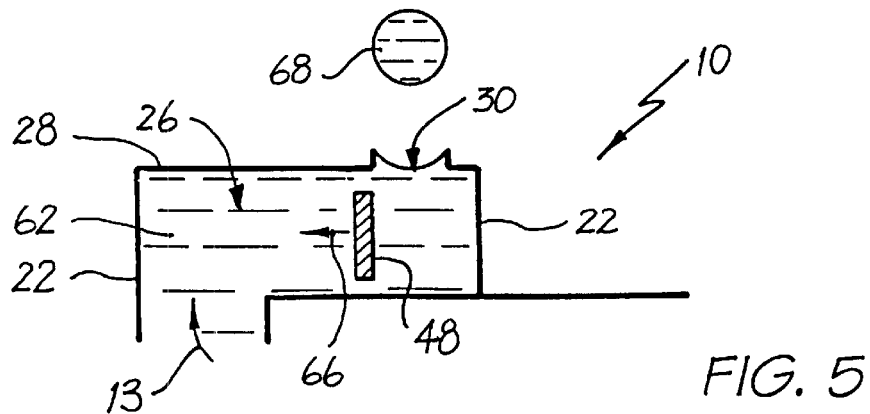
FIG. 5 shows a schematic view of the nozzle arrangement of FIG. 1 in a terminal operative condition.

It will be appreciated that, upon cooling and subsequent contraction of the heater element 52 when the current is discontinued, the paddle 48 moves in the direction of an arrow 66 as shown in FIG. 5. This serves to reduce ink pressure at the region of the ink ejection port 30, thereby resulting in a necking and subsequent breaking off of a drop 68 of the ink 62.

In order to facilitate this return movement, the material of the actuator arm 34 can be resilient so that the actuator arm 34 can return to an original or inoperative condition under tension built up within the actuator arm 34.

It will thus be appreciated that, by controlling the supply of electrical current to the heater element 52, via a suitable control system connected to the drive circuitry layer 18, selective ejection of ink from the nozzle arrangement 10 can be achieved.

Figure 6:
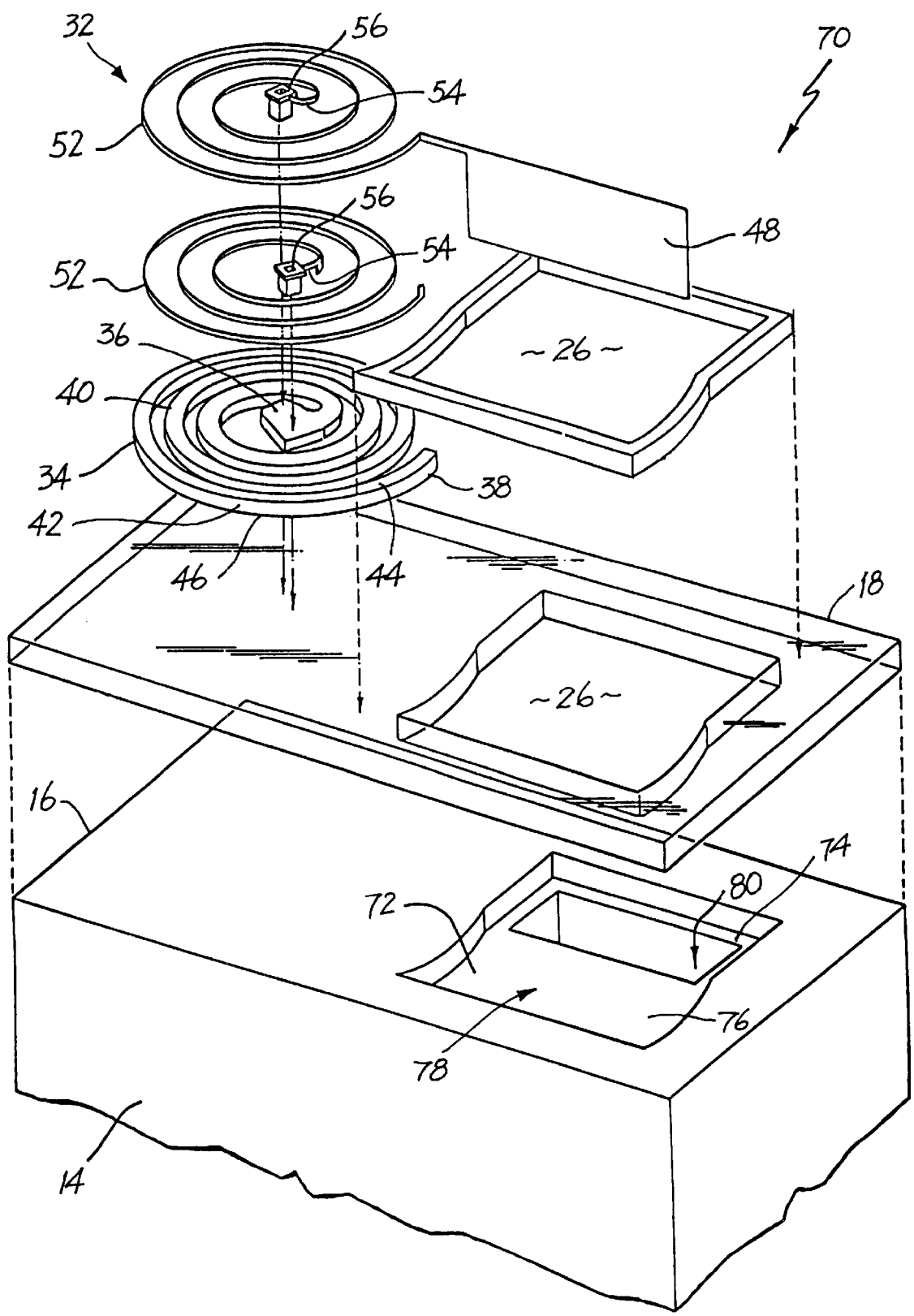
FIG. 6 shows an exploded, three dimensional view of a second embodiment of a nozzle arrangement, in accordance with the invention, for an ink jet printhead.
Figure 7:
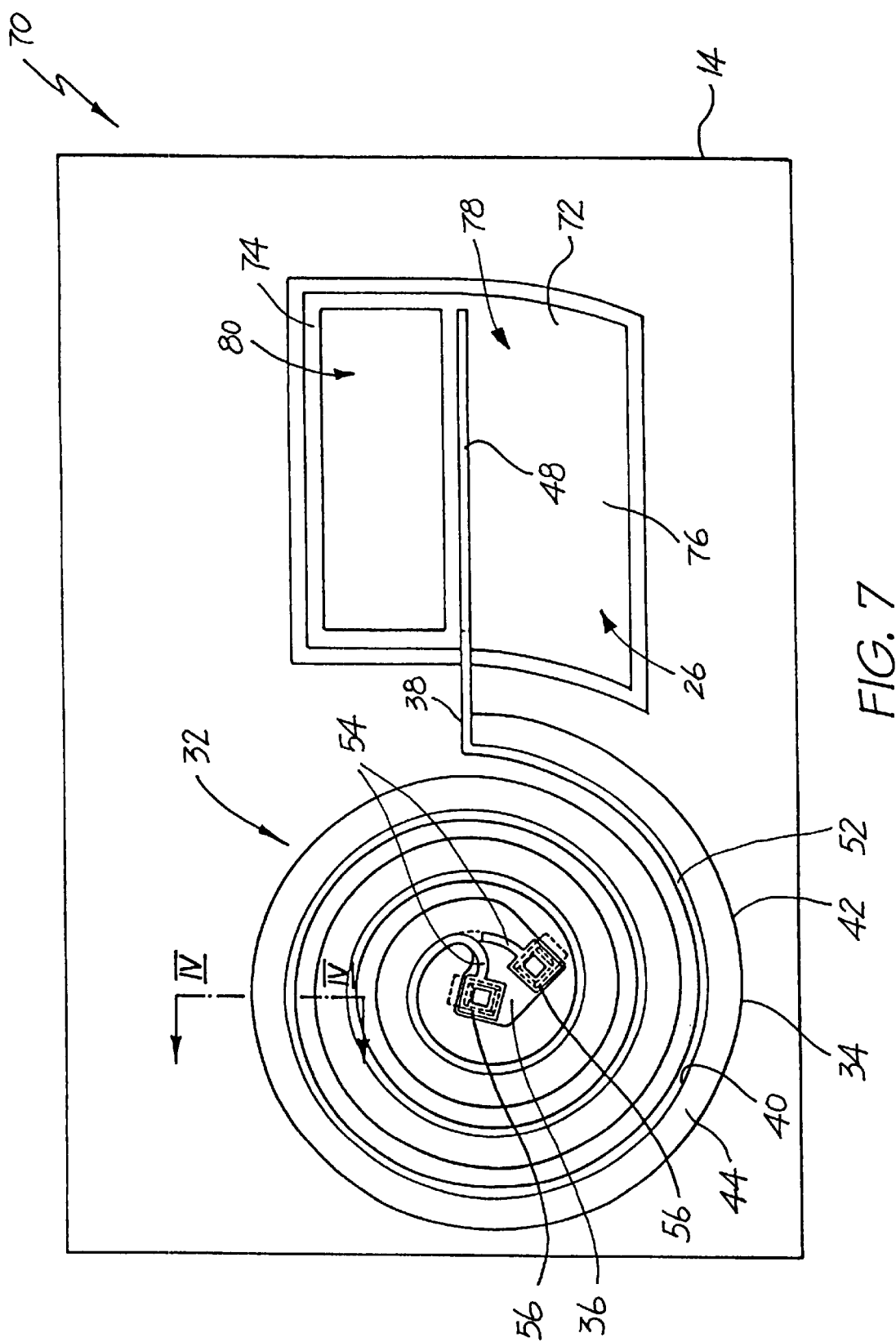
FIG. 7 shows a schematic plan view of the nozzle arrangement of FIG. 6 in an inoperative condition.
Figure 8:
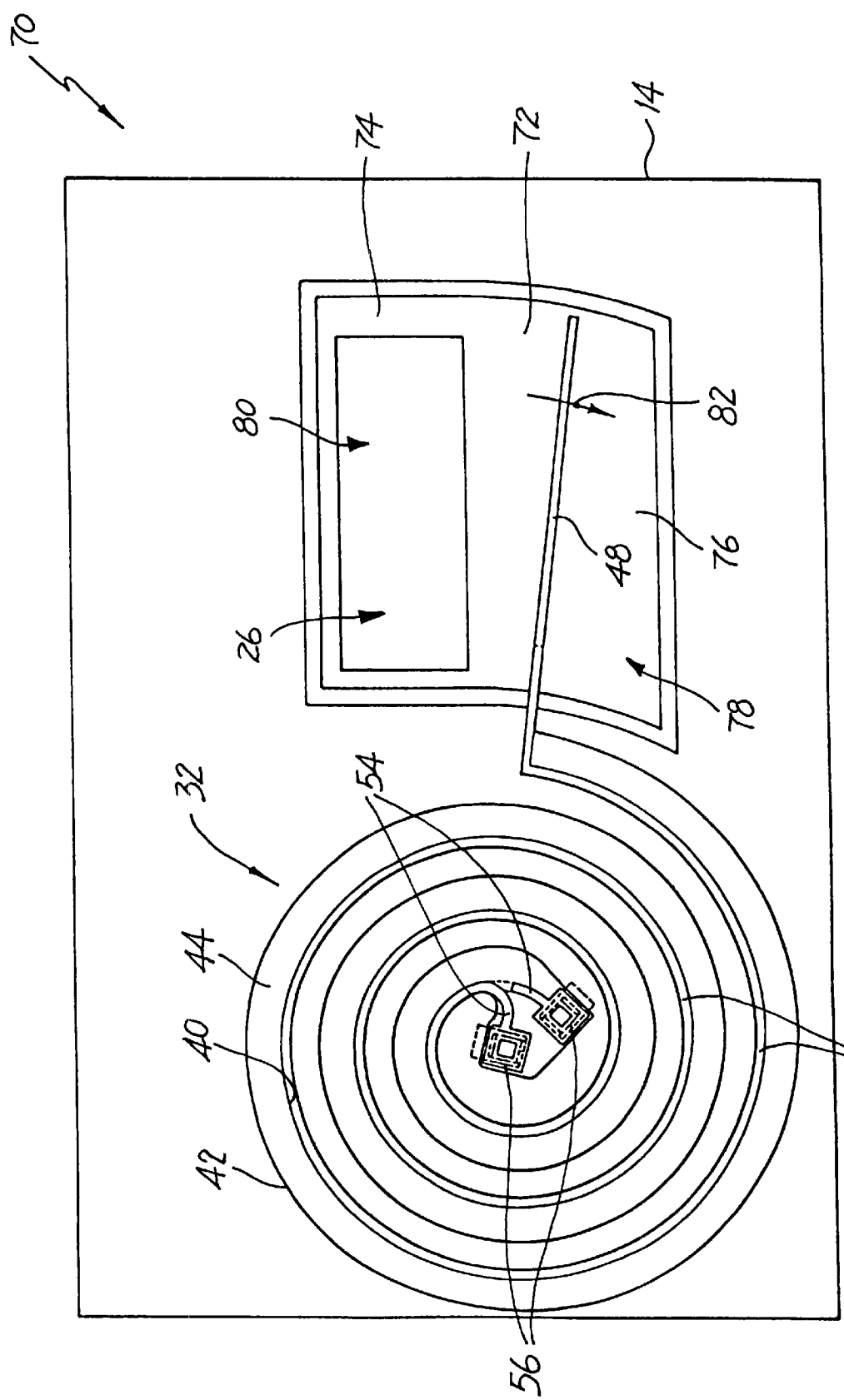
FIG. 8 shows a schematic plan view of the nozzle arrangement of FIG. 6 in an operative condition.

In FIGS. 6 to 8, reference numeral 70 generally indicates a second embodiment of a nozzle arrangement, in accordance with the invention, for an ink jet printhead. With reference to FIGS. 1 to 5, like reference numerals refer to like parts, unless otherwise specified.

The nozzle arrangement 70 is substantially the same as the nozzle arrangement 10. However, the nozzle arrangement 70 does not include the walls 22, 24 extending from the substrate 14 and the roof wall 28 defining the ink ejection port 30. Instead, the nozzle chamber 26 is formed, in an etching process, in the wafer substrate 16 and the drive circuitry layer 18. In this example, the wafer substrate 16 is etched to define a floor 72 having a planar portion 74 and a curved portion 76 which defines a trough-like formation 78. The ink inlet channel 20 is defined in the wafer substrate 16 through an etching process and opens at an inlet 80 defined in the planar portion 74 of the floor 72.

The actuator arm 34 is displaceable in the manner described with reference to the nozzle arrangement 10. In this example, however, the actuator arm 34 and the paddle 48 are positioned so that, when the actuator arm 34 is in a quiescent condition, as shown in FIG. 7, the paddle 48 is positioned between the inlet 80 and the trough-like formation 78 of the floor 72. When the heater element 52 is activated, subsequent displacement, in the manner described earlier, of the actuator arm 34 urges the paddle 48 into an operative position, as shown in FIG. 8, in the direction of an arrow 82. This has the effect of scooping the ink out of the trough-like formation 78. The trough-like formation 78 is therefore shaped to facilitate ejection of a drop of ink away from the substrate 14.

Figure 9:
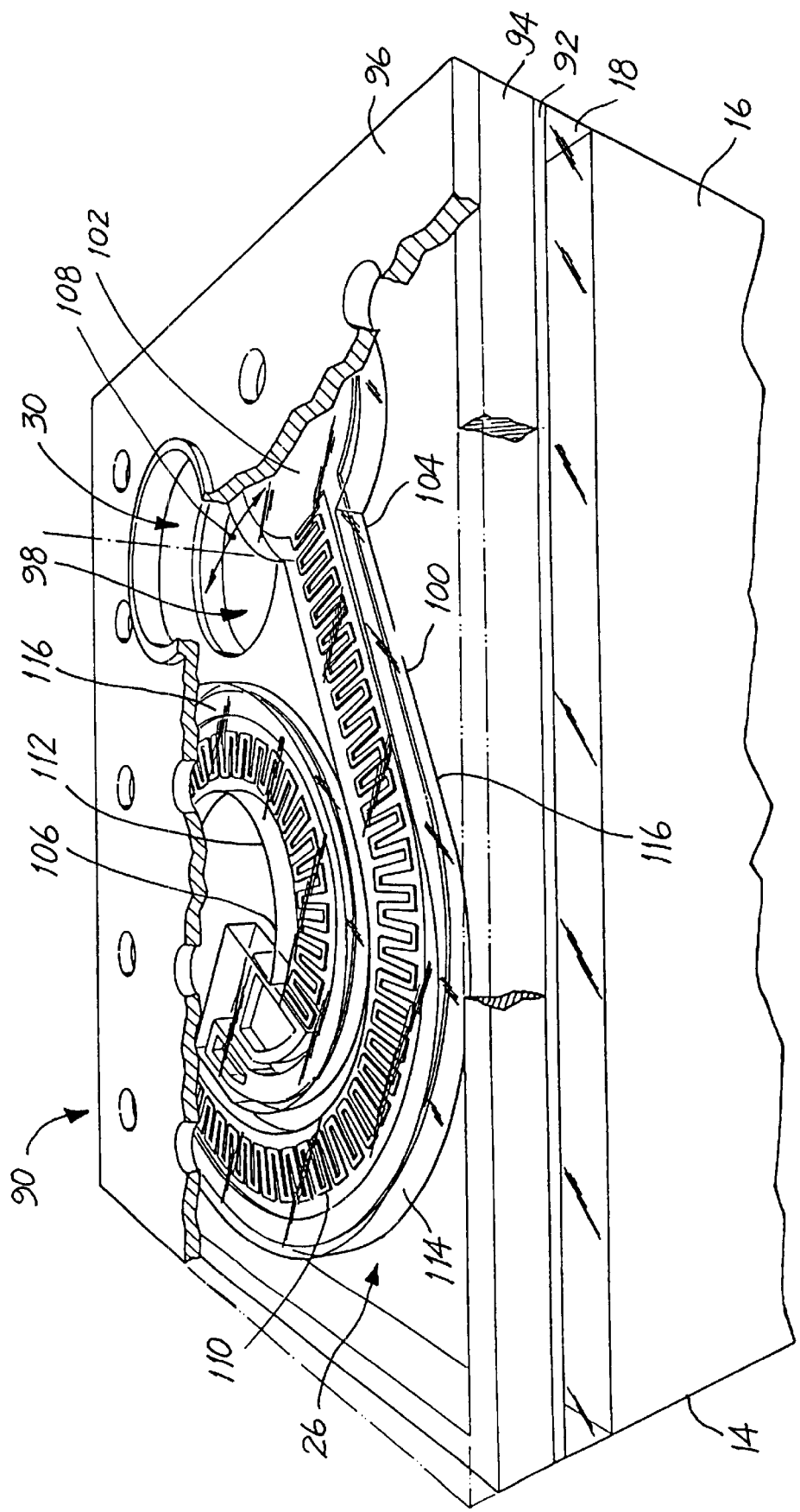
FIG. 9 shows a partly sectioned, three dimensional view of a third embodiment of a nozzle arrangement, in accordance with the invention, for an ink jet printhead.

In FIG. 9, reference numeral 90 generally indicates a third embodiment of a nozzle arrangement, in accordance with the invention, for an ink jet printhead. With reference to FIGS. 1 to 8, like reference numerals refer to like parts, unless otherwise specified.

In the nozzle arrangement 90, an ink passivation layer 92 is positioned on the drive circuitry layer 18. In this particular example, the nozzle chamber 26 is defined by two pairs of opposed side walls 94 that extend from the ink passivation layer 92 and a roof wall 96 positioned on the side walls 94. As before, the ink ejection port 30 is defined in the roof wall 96.

An ink inlet 98 is defined in the layers 92, 18 and in the wafer substrate 16. This permits the ingress of ink into the nozzle chamber 26.

In this example, ink within the nozzle chamber 26 is cyclically pressurized to an extent sufficient to eject ink from the ink ejection port 30. Thus, the ink inlet 98 is in fluid communication with an ink reservoir (not shown), ink within the ink reservoir being cyclically pressurized in this manner.

In this example, the actuator 32 is positioned in the nozzle chamber 26. the actuator 32 includes an actuator arm 100 which is of a material having a coefficient of thermal expansion that is sufficiently high so that, when heated, subsequent expansion of the material of the actuator arm 34 is sufficient to allow the actuator arm 100 to perform work. An example of a suitable material is polytetrafluoroethylene (PTFE).

A closure member or shutter 102 is mounted on an outer end 104 of the actuator arm 100. As with the previous embodiments, an inner end 106 of the actuator arm 100 is fast with the substrate 14.

The actuator arm 100 and the shutter 102 are positioned so that the shutter 102 is displaced in the direction of an arrow 108 between a closed position in which the shutter 102 is positioned over the ink inlet 98 to inhibit the ingress of ink into the nozzle chamber 26 and an open condition in which ink is permitted to enter the nozzle chamber 26.

The actuator 32 includes a heater element 110 that is embedded in the actuator arm 100. As with the actuator arm 34, the actuator arm 100 has a generally rectangular cross section with an inner minor side 112, an outer minor side 114 and a pair of opposed major sides 116.

The heater element 110 is positioned closer to the inner minor side 112 than to the outer minor side 114. Thus, an inner, longitudinal portion of the actuator arm 100 is heated to a greater degree than a remaining longitudinal portion. As a result, this inner longitudinal portion expands to a greater degree than the rest of the actuator arm 100. It will be appreciated that this results in a partial uncoiling of the actuator arm 100. The material of the actuator arm 100 can be resilient to facilitate a partial coiling of the actuator arm 100 upon cooling of said inner longitudinal portion of the actuator arm 100.

It will thus be appreciated that selective ejection of ink from the ink ejection port 30 can be achieved with a suitable control system connected to the drive circuitry layer 18.

Applicant believes that this invention provides a means whereby an actuator is provided which lends itself to manufacture in accordance with an integrated circuit fabrication technique. Still further, the coiled nature of the actuator allows a substantial space saving with consequent cost savings.

I claim:

1. A nozzle arrangement for an ink jet printhead, the nozzle arrangement comprising a substrate; and an actuator that is positioned on the substrate to facilitate the ejection of ink from a nozzle chamber of the nozzle arrangement, the actuator comprising an elongate, flexible, curved actuator arm having an inner end and an outer end, the inner end being fixed to the substrate; and an actuating mechanism that is operatively arranged with respect to the actuator arm to straighten the actuator arm at least partially when activated such that the outer end is displaced to an extent sufficient to perform work.

2. A nozzle arrangement as claimed in claim 1, which is the product of an integrated circuit fabrication technique.

3. A nozzle arrangement as claimed in claim 2, which is in the form of a micro electro-mechanical device.

4. A nozzle arrangement as claimed in claim 2, in which the substrate includes a wafer substrate and a drive circuitry layer positioned in the wafer substrate.

5. A nozzle arrangement as claimed in claim 4, in which the actuator arm is curved to define a coil.

6. A nozzle arrangement as claimed in claim 5, in which the actuator arm is coiled through at least 360 degrees.

7. A nozzle arrangement as claimed in claim 4, in which the actuating mechanism includes a conductive heater element that is fixed to an inner side of the actuator arm and is connected to drive circuitry in the drive circuitry layer, the heater element being capable of being resistively heated when an electrical current from the drive circuitry layer is set up in the heater element, the heater element being capable of expansion when so heated, so that, when the heater element expands, the actuator arm is partially straightened so that the outer end of the actuator arm is displaced to perform work.

8. A nozzle arrangement as claimed in claim 4, in which the actuator arm is substantially of a material having a coefficient of thermal expansion which is such that, when heated, subsequent expansion of the material is sufficient to perform work, the actuating mechanism including a conductive heater element which is positioned in the actuator arm at or proximate an inner side of the actuator arm so that an inner longitudinal portion of the actuator arm is heated to a greater extent that an outer longitudinal portion of the actuator arm resulting in greater expansion of said inner longitudinal portion with a subsequent partial straightening of said actuator arm so that the outer end of the actuator arm is displaced to perform work.

9. A nozzle arrangement as claimed in claim 1, in which a paddle is mounted on the outer end of the actuator arm and is positioned in the nozzle chamber to eject ink from the nozzle chamber.

10. A nozzle arrangement as claimed in claim 1, in which the substrate defines an inlet for the nozzle chamber, so that ink can be supplied to the nozzle chamber.

11. An ink jet printhead which comprises a substrate; and a plurality of nozzle arrangements positioned on the substrate, each nozzle arrangement comprising an actuator to facilitate the ejection of ink from a nozzle chamber of the nozzle arrangement, the actuator comprising an elongate, flexible, curved actuator arm having an inner end and an outer end, the inner end being fixed to the substrate; and an actuating mechanism that is operatively arranged with respect to the actuator arm to straighten the actuator arm at least partially when activated such that the outer end is displaced to an extent sufficient to perform work.

* * * * *